-FIG. 1.-

3,488,755
RELAY STOP CIRCUIT FOR A PATTERN CONTROLLED TUFTING MACHINE
Norman Pickles, Blackburn, England, assignor to Blackburn Electronic Production Controls Limited, Blackburn, England, a British company
Filed May 26, 1967, Ser. No. 641,629
Claims priority, application Great Britain, May 26, 1966, 23,643/66
Int. Cl. H01h 9/00, 47/00
U.S. Cl. 317—157     3 Claims

ABSTRACT OF THE DISCLOSURE

In a pattern controlled tufting machine having a plurality of pattern-operated relays each adapted to produce a pulse at one contact during operation or release, a stop motion device comprising a stop relay for each pattern relay and a group of apparatus common to all said stop relays said group including a timer, means for operating each pattern-operated relay at least once during a time predetermined by said timer, a pulse-operated device including a stop relay connected to the pulse-producing contact of each of said pattern operated relays, means for locking said stop relay operated until the end of said predetermined time, a contact group containing a contact of each of said stop relays, a further relay in said common apparatus group operated during said predetermined time if one or more of said stop relays remain unoperated, and a contact of said further relay connected to stop the operation of said tufting machine on operation of said further relay.

---

My invention relates to means for giving an alarm should an electrical relay in a circuit fail to operate or release during a repeated cycle.

My invention is more particularly concerned with means for operating the controls of a textile machine known as a tufting machine, which is controlled by a pattern, there being optical pickup means for effecting needle control. In a machine of this character, the pattern is, for example, wound around a drum and is then passed slowly below sensing means comprising photo-sensitive devices, each of which is connected to a pattern relay which itself controls the yarn feed to one or more needles of the machine. If for any reason a relay fails to operate or release when it should, during one complete passage of the pattern below the sensing means, then the weave produced by the machine is faulty, and has to be amended afterwards. The sooner such a fault is indicated the better, and I provide a stop means for this purpose.

Each relay actuated by a photo-sensitive device is provided with a change-over contact, and it is assumed, first, that each such pattern relay operates or releases at least once during passage of a complete pattern past the sensing means. It is also assumed that the break contact of the changeover breaks before the make contact makes.

According to my invention, a stop motion device for a pattern controlled tufting machine having a plurality of pattern-operated relays each adapted to produce a pulse at one contact during operation or release, comprises a stop rely for each pattern relay and a group of apparatus common to all the stop relays, the said group including a timer or delay, connections being such that if during a predetermined period one or more stop relays remain unoperated, the machine is stopped and an alarm is given indicative of the faulty pattern relay circuit.

Figure 1:
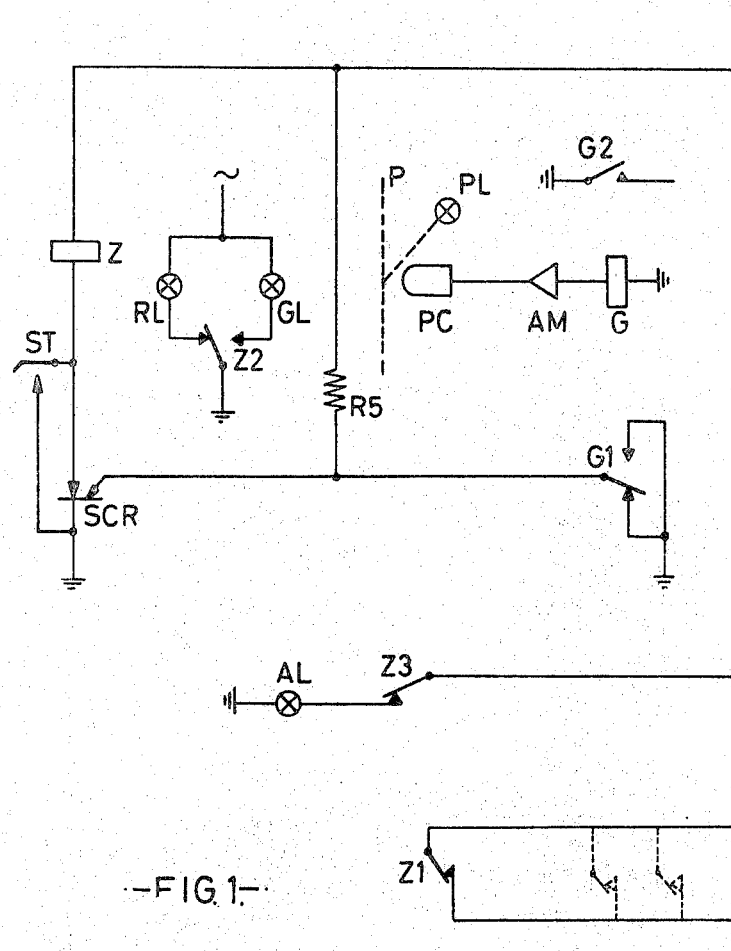
Figure 2:
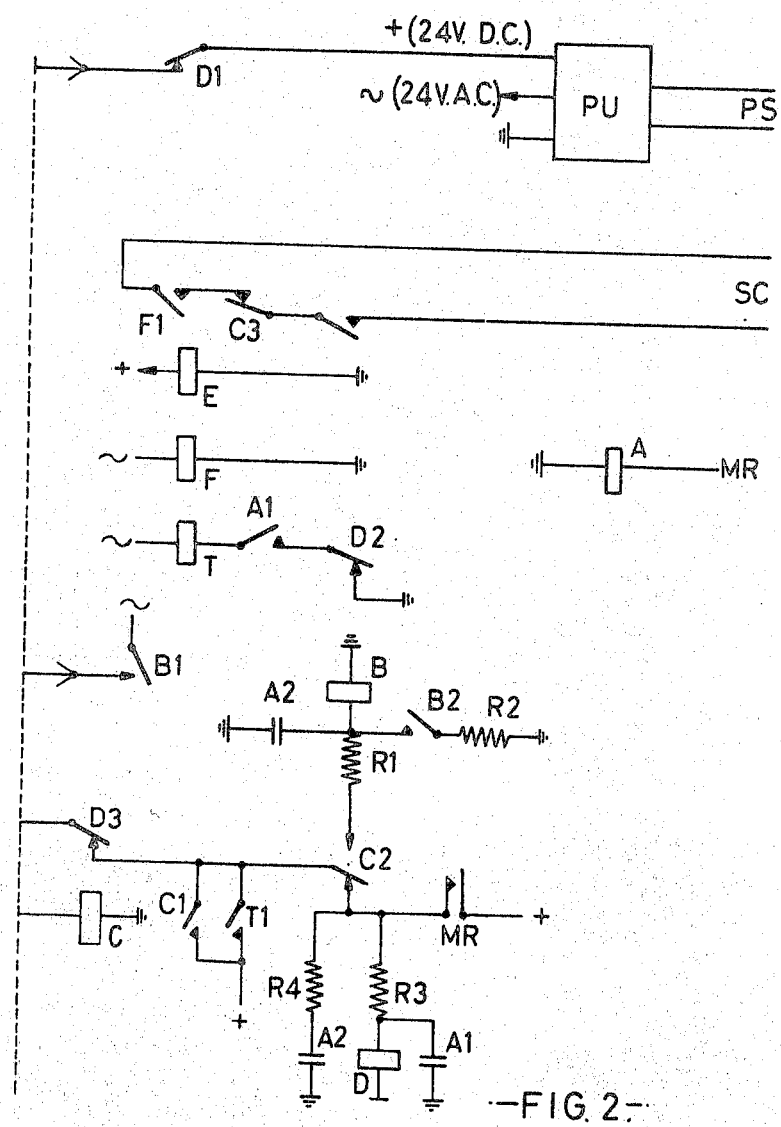

Reference should now be made to the accompanying drawings, in which:

FIG. 1 is a group of apparatus (module) associated with each photo-sensitive device, FIG. 2 is a group of apparatus common to all the groups similar to that of FIG. 1.

From FIG. 1 it will be seen that part of the patterning arrangements of the machine are shown. This consists of a pattern P consisting of light and dark parts, illuminated by a lamp PL. There is a photo-cell PC shown in FIG. 1, there being a large number of photo-cells located in a straight line across the pattern, each photo-cell controlling one or more needles of the tufting machine. The output of the photo-cell is conducted to an amplifier AM from which a relay G is operated every time a light part of the pattern passes beneath the photo-cell PC. The apparatus module associated with the photo-cell PC comprises also a stop relay Z in series with a silicon controlled rectifier SCR, with a short circuiting switch ST to cut out this silicon device when required, and an alarm lamp AL.

During passage of, say, one pattern repeat past the photo-cell PC, it is assumed that relay G will operate and release at least once. Contact G1 on this relay, when the relay operates, loses contact from the break contact and then changes over again to make with the make contact. This produces a pulse or absence of earth on the lead connected to the striking or gate electrode of the silicon controlled rectifier SCR, this contact rising in potential since the resistor R5 is connected to positive potential (see later). When striking or gating of SCR occurs, relay Z operates in series with it, and stays operated until some subsequent period. Contact Z1 removes a loop applied across a pair of wires, and all the Z1 contacts of each of the modules are connected across this pair of wires as shown dotted. Contact Z2 changes over from a red lamp RL to a green lamp GL indicating that the module concerned is operating correctly, and contact Z3 cuts the circuit of an alarm lamp AL.

If the particular photo-cell PC concerned does not encounter a light (or dark) part of a pattern during a complete traverse thereof under the row of photo-cells, then the switch ST is closed. This ensures that relay Z operates, and thus prevents incorrect actuation of an alarm (see later). Each such photo-cell module has a switch similar to ST, and the number of switches to be closed is determined prior to a carpet manufacturing run, in accordance with the pattern.

Referring to FIG. 2, this common apparatus consists of a power unit PU energised from a power source PS. The power unit produces a 24 volt D.C. supply + and a 24 A.C. supply, continuously. There are also a group of relays A–F.

Relay A is connected to a contact in the tufting machine start circuit, and operates as soon as the machine starts to run. Relays E and F are connected to the 24 bolt D.C. and 24 volt A.C. circuits respectively, and so are always operated unless a power failure occurs.

Assuming that the machine is to be run, the power is switched on, and relays A, E, and F all operate. A1 energises relay T but this relay is provided with a time delay approximately equal to the time of passage of one repeat of the pattern P in front of the photo-cells. The relay does not yet operate its contact T1. Contacts E1 and F1 close a loop through C3 to a stop circuit SC in the tufting machine. As long as this loop is present, the machine continues to run.

The pattern now runs slowly past the row of photocells PC, and following the assumption mentioned above, each of the photo-cells operates or releases its relay G at least once during the passage of a pattern repeat i.e. the time of operation of relay T. Each relay G therefore switches over its contact G1 and each G1 contact strikes its associated SR, thus operating all the Z relays. All the contacts Z2 change over to the green lamps, showing all the modules to be in an operative condition, all the contacts Z3 open so that the alarm lamps AL cannot be lit, and all the contacts Z1 open.

At the end of a pattern repeat, relay T operates and its contact T1 attempts to operate relay C. Since all of Z1 contacts are open, this does not occur. However, T1 does operate relay D via C2 and R3. D1 releases all the Z relays in the modules and extinguishes all the SCR's.

Contact D2 releases relay T, and contact T1 releases relay D after a slight delay caused by capacitor A2. Contact D1 restores the operating potential for all the SCR's and Z relays, and D2 restarts the operating procedure to relay T.

This cycle continues, assuming that all the photo-cell modules operate correctly. If however the module shown in FIG. 1 is not operating correctly, then during a particular pattern passage past the photo-cells, no impulse is given to SCR to operate. Relay Z remains unoperated, with the result that at the end of the pattern repeat, when relay T operates, the red lamp RL is illuminated, and contact Z1 is closed. Now when relay T operates, T1 operates relay C via D3 and the closed Z1 contact. C1 locks relay C operated, and the delay network R3, A1 prevents relay D flicking up during the operation time of relay C. Contact C2 charges capacitor A2 slowly through R1 up to the operating voltage of relay B, which then operates. Contact B2 discharges capacitor A2 slowly through R2 to the release voltage of relay B, this voltage being considerably lower than the operating voltage, whereupon relay B releases. This cycle continues so long as relay C is operated. Contact B1 flashes any AL lamp with its Z3 contact closed. Contact C3 opens the loop including E1 and F1, and thus energises the stop circuit SC of the tufting machine, which stops at the end of a pattern run.

From this description it will be seen that a stop motion has been provided for a machine such as a textile tufting machine having a plurality of pattern operated devices, the stop circuit being adapted to stop the machine at the end of a pattern repeat during which a faulty operation has resulted. When the stoppage occurs, the machine operator can readily see from the flashing alarm lamp AL which of the modules is faulty. This is reinforced by the fact that the module concerned has its red lamp RL lit instead of its green lamp GL. The module can then either be removed by unplugging, and another module reinserted as a replacement, or it may be repaired on the spot and replaced. In any case the circuit prevents the production of a spoilt weave extending beyond one pattern repeat.

After the occurrence of a fault and its localisation and repair, the manually operated push switch MR is momentarily depressed. This operates relay D, and contact D1 extinguishes all the SCR's which have been rendered conductive, and releases their associated Z relays. Contact D2 releases the time relay T and contact D3 releases relay C.

The release of the switch MR releases relay D, and the cycle is ready for recommencement.

Although the timing relay T has been shown as providing the predetermined delay it could of course be operated from any portion of the mechanism associated with the pattern repeat which makes a contact once every pattern repeat. This would then automatically provide the necessary delay.

I claim:

1. In a pattern controlled tufting machine having a plurality of pattern-operated relays each adapted to produce a pulse at one contact during operation or release, a stop motion device comprising a stop relay for each pattern relay and a group of apparatus common to all said stop relays, said group including a timer, means for operating each pattern-operated relay at least once during a time predetermined by said timer, a pulse-operated device including a stop relay connected to the pulse-producing contact of each of said pattern-operated relays, means for locking said stop relay operated until the end of said predetermined time, a contact group containing a contact of each of said stop relays, said contacts being connected in parallel, a further relay in said common apparatus group, a connection from said contact group to operate said further relay during said predetermined time if one or more of said stop relays remain unoperated, said further relay remaining unoperated if all said stop relays operate during said time, and a contact of said further relay connected to stop the operation of said tufting machine on operation of said further relay.

2. A stop motion device as recited in claim 1, wherein said pulse device includes a change-over contact of said pattern-operated relay connected to apply gating potential to the gate electrode of a controlled rectifier, said stop relay being connected in series with said rectifier.

3. A stop motion device as set forth in claim 2 further comprising a stop relay contact and indicator lamps, said stop relay contact controlling the illumination of said indicator lamps, said lamps being colored to distinguish correct from faulty operation of said pattern controlled relay.

References Cited

UNITED STATES PATENTS

| | | | |
|---|---|---|---|
| 2,569,475 | 10/1951 | Klein | 28—51 |
| 2,611,017 | 9/1952 | Bailey. | |
| 2,994,074 | 7/1961 | Durand et al. | 340—259 |
| 3,103,656 | 9/1963 | Laman et al. | 340—259 |
| 3,311,794 | 3/1967 | Holland et al. | 317—157 X |

LEE T. HIX, Primary Examiner

U.S. Cl. X.R.

307—116, 149; 340—259